Aug. 24, 1926.

O. L. RILEY 1,597,249

CYLINDER LINER

Filed March 28, 1925

Inventor
Orey L. Riley
by
his Attorney

Patented Aug. 24, 1926.

1,597,249

UNITED STATES PATENT OFFICE.

OREY L. RILEY, OF FULLERTON, CALIFORNIA.

CYLINDER LINER.

Application filed March 28, 1925. Serial No. 19,044.

This invention has to do with a pump construction and has particular reference to a cylinder liner for pumps, or the like.

Pumps and like mechanisms, for instance, slush pumps, require frequent repairs because of the cylinder liners becoming scarred and worn. The replacement or repairing of cylinder liners is more or less expensive and frequently causes great inconvenience.

It is an object of this invention to provide a pump liner which will retain its finish for a very long time under ordinary operating conditions.

It is a further object of my invention to provide a liner which will carry a piston packed with rubber, or the like, with a minimum of friction.

Figure 1:
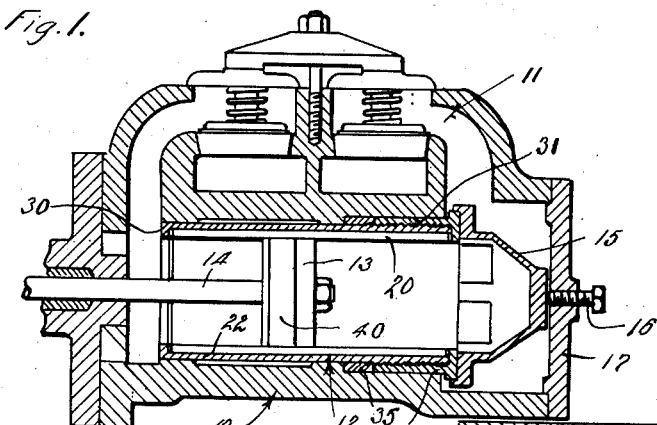

The objects and features of my invention will be best and more fully understood from the following detailed description of a typical form and application of the invention throughout which description reference is had to the accompanying drawings in which Fig. 1 is a sectional view of a typical pump showing the cylinder provided with a liner embodying the present invention.

Figure 2:
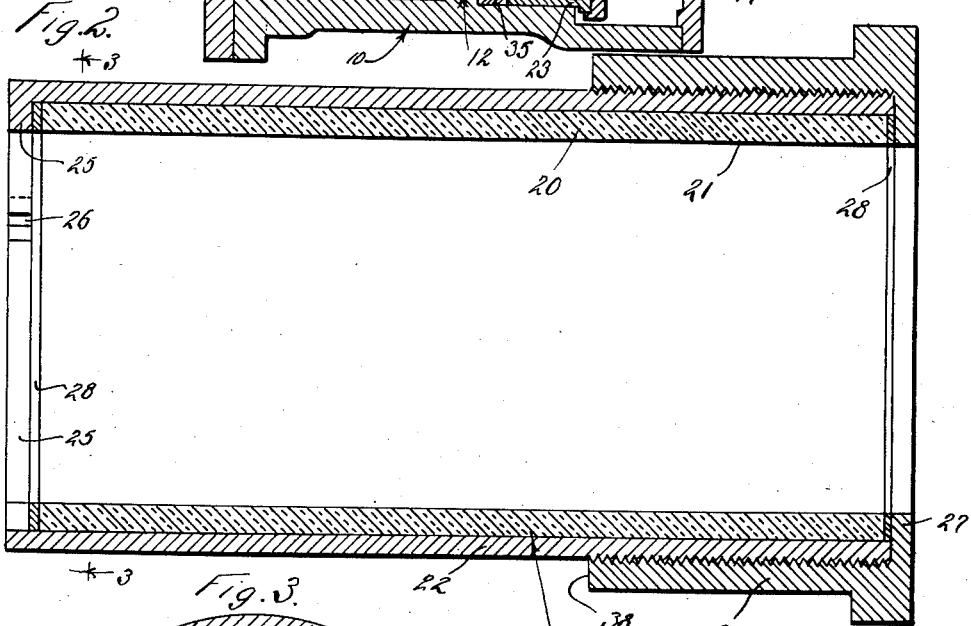
Figure 3:
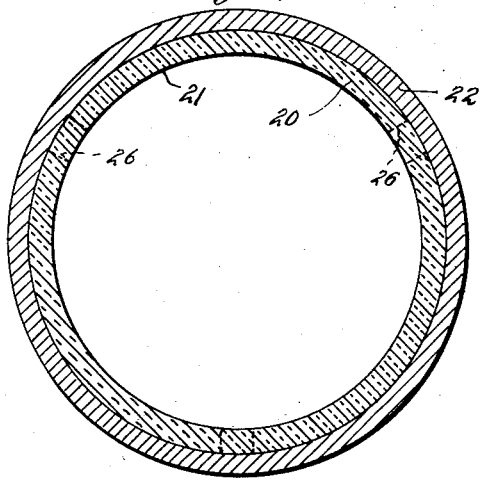

Fig. 2 is an enlarged longitudinal sectional view of the liner provided by the invention, and Fig. 3 is a transverse sectional view taken as indicated by line 3—3 on Fig. 2.

My present invention is capable of embodiment in various forms and is applicable to various mechanisms. The invention is particularly suited, however, to slush pumps and like mechanisms, so therefore, I will herein set forth my invention as applied to such a mechanism, it being understood that the broader aspects of my invention are not to be limited by this particular reference.

In the drawings numeral 10 designates, generally, the pump cylinder, numeral 11 a valve chest carrying suitable valves and having communication with the ends of the cylinder, numeral 12 the liner provided in the cylinder, numeral 13 a piston arranged in the liner and numeral 14 a piston rod which carries the piston and extends through one end of the cylinder. The general construction and arrangement of the parts just mentioned is that common to slush pumps and therefore needs no detailed description. The liner 12 which is the part provided by my present invention is removably carried in the cylinder 10. The liner is supported in the cylinder at spaced points as will be hereinafter described and is retained in place by a typical construction including a member 15, known in the art as a liner crab, and a set screw 16 carried by the cylinder head 17. The set screw 16 bears against the crab 15 which in turn bears against one end of the liner.

The liner 12 provided by my invention includes a cylinder 20 having an extremely hard smooth inner surface 21 and a carrier for the cylinder including a body part 22 which holds the cylinder 20 and a cap 23 which retains the cylinder 20 in the body 22. In accordance with my invention I form the cylinder 20 of a material which is extremely hard and which may be finished so that it has a very smooth surface. I prefer in practice to form the cylinder of glass, for instance, I prefer to blow it of glass and when necessary grind and polish the inner surface 21 so that the inner diameter of the cylinder is uniform in size and shape throughout its length. The outside of the cylinder may be of a size and shape to properly fit the body 22 of the carrier, it being preferred in practice to proportion the cylinder so that it is comparatively thick and heavy and to form it so that its outer surface is uniform in diameter throughout its length, as this form of cylinder is easily manufactured.

The carrier provided for the cylinder 20 is formed of metal and is made to effectively carry the cylinder 20 and to properly fit the pump cylinder 10. In the preferred form of construction the carrier includes a body 22 which is cylindrical in form and is proportioned to receive and carry the cylinder 20, as clearly shown in Fig. 2 of the drawings. The body 22 is provided at one end, which I will term the inner end, with an inwardly extending flange 25 which serves as an abutment for the inner end of the cylinder 20. The flange 25 is proportioned so that it does not project beyond the inner surface 21 of the cylinder 20 and may be provided with one or more notches or recesses 26 to allow a liner puller, or the like, to be applied to the cylinder.

The cap 23 is provided at the other or outer end of the body and is, in the particular form of construction illustrated in the drawings, screw threaded onto the outer end of the body and is provided with an inwardly extending flange 27 adapted to hold the cylinder 20 in the body. The flange 27 is proportioned to project over and inwardly past the end of the body 22 so that it operates to engage and retain the cylinder 20 in the body. In practice I prefer to provide washers 28 of suitable material, such as packing between the ends of the cylinder 20 and the flanges 25 and 27 so that the cylinder is not broken by the strain or pressure caused by tightening of the cap 23 on the body. In the particular construction shown in the drawings the pump cylinder 10 is provided at its inner end with an opening 30 to receive the inner end of the liner 12 and at its outer end with an opening 31 to receive the outer end of the liner, the opening 31 being larger in diameter than the opening 30 and there being a shoulder between the parts 30 and 31 adapted to carry packing. In accordance with my invention the carrier provided for the glass cylinder 20 is shaped and proportioned to properly fit the pump cylinder 10. In the particular construction shown in the drawings the inner end of the body 22 of the carrier is made to fit the part 30 of the pump cylinder 10 while the cap 23 is made to fit the part 31 of the cylinder. As the liner is applied to the pump cylinder the packing 35 is arranged between the shoulder in the cylinder and the end 38 of the cap. This packing operates to pack the connection between the liner and cylinder to prevent leakage around the liner.

The liner provided by my invention may be applied to and removed from the cylinder 10 in much the same manner as an ordinary liner. The glass cylinder 20 of the liner, is, of course, the part which carries the piston 13 of the pump. The cylinder 20 being of glass presents a very hard wearing surface which is not worn or scarred by materials which will quickly destroy an ordinary metal liner. Further, in cases where the pump piston 13 is provided with a rubber packing 40 the glass cylinder offers a minimum of resistance to movement of the piston in that rubber operating on the glass in the presence of water, or like fluid, slides very freely.

With the construction provided by my invention the glass cylinder 20 may be removed for purpose of replacement or repair by simply removing the cap 23 from the body 22 of the carrier. If the liner 20 has been in place a long time and has become set in the body of the carrier it is always possible to remove it by breaking it which of course does not in any way injure the carrier.

Having described only a typical preferred form of my invention I do not wish to limit myself to the specific details set forth, but wish to reserve to myself any changes or variations that may appear to those skilled in the art or fall within the scope of the following claims.

Having described my invention, I claim:

1. A liner to be arranged in a cylinder having a shoulder including a cylindrical body of glass, and a carrier for mounting the glass in the cylinder, the carrier including two parts screw threaded together one part being adapted to cooperate with the shoulder in holding packing.

2. A liner to be arranged in a cylinder having a shoulder including a cylindrical body of glass, and a carrier for mounting the glass in the cylinder, the carrier including two parts screw threaded together and having flanges engaging the ends of the body of glass, one part being adapted to cooperate with the shoulder in holding packing.

3. In combination, a cylinder having a shoulder, a liner, a carrier for the liner including two parts screw threaded together and having end flanges engaging the ends of the liner, packing arranged between one of the carrier parts and the shoulder, and a single means holding the carrier in the cylinder and the packing under pressure.

In witness that I claim the foregoing I have hereunto subscribed my name this 5 day of March 1925.

OREY L. RILEY.